US011255652B2

(12) United States Patent
Jin et al.

(10) Patent No.: US 11,255,652 B2
(45) Date of Patent: Feb. 22, 2022

(54) METHODS AND APPARATUS FOR DETERMINING A HEIGHT OF AN EDGE PORTION OF A PRODUCT

(71) Applicant: CORNING INCORPORATED, Corning, NY (US)

(72) Inventors: Xiaorui Jin, Guangdong (CN); Ping Ni, Shanghai (CN); Shixian Tian, Yulin (CN)

(73) Assignee: CORNING INCORPORATED, Corning, NY (US)

( * ) Notice: Subject to any disclaimer, the term of this patent is extended or adjusted under 35 U.S.C. 154(b) by 302 days.

(21) Appl. No.: 16/662,451

(22) Filed: Oct. 24, 2019

(65) Prior Publication Data
US 2020/0141713 A1 May 7, 2020

(30) Foreign Application Priority Data

Nov. 5, 2018 (CN) .......................... 201811305980.0

(51) Int. Cl.
*G01B 5/20* (2006.01)
*G01B 5/06* (2006.01)

(52) U.S. Cl.
CPC .................... *G01B 5/061* (2013.01)

(58) Field of Classification Search
CPC ...................................................... G01B 5/061
USPC ................................................... 33/533, 557
See application file for complete search history.

(56) References Cited

U.S. PATENT DOCUMENTS

| 2,672,049 A * | 3/1954 | Hallendorff .............. G01B 5/28 |
| | | 73/105 |
| 4,064,633 A * | 12/1977 | Wertepny ................. G01B 5/08 |
| | | 33/550 |
| 4,752,166 A | 6/1988 | Lehmkuhl |
| 5,883,313 A | 3/1999 | Ercole et al. |
| 6,725,557 B2 | 4/2004 | Kushibiki et al. |
| 6,907,672 B2 | 6/2005 | Said |

(Continued)

FOREIGN PATENT DOCUMENTS

| BE | 1001412 A5 | 10/1989 |
| BE | 1001415 A7 | 10/1989 |

(Continued)

OTHER PUBLICATIONS

International Search Report and Written Opinion of the European International Searching Authority; PCT/US2019/059328; dated Feb. 26, 2020; 16 pgs.

*Primary Examiner* — George B Bennett
(74) *Attorney, Agent, or Firm* — John P. McGroarty (57) ABSTRACT

Apparatus can comprise a probe movable in a direction along a probe axis that intersects a determination axis and a clamping pin can be movable along a clamping pin axis that intersects a product support area of a base. In some embodiments, methods of determining a height of an edge portion of a product can comprise aligning the edge portion of the product along a determination axis and clamping the product to a base at a clamping location of the product positioned over a product support area. Methods can further comprise extending a probe to contact a location of the edge portion of the product while the product is clamped to the base. Methods can further comprise determining a height of the edge portion of the product based on the position of the probe contacting the edge portion of the product.

26 Claims, 8 Drawing Sheets

(56) References Cited

U.S. PATENT DOCUMENTS

| | | |
|---|---|---|
| 7,047,657 B2 | 5/2006 | Goeggelmann et al. |
| 7,509,218 B2 | 3/2009 | Hoysan et al. |
| 8,294,758 B2 | 10/2012 | Lynde |
| 9,074,863 B2 * | 7/2015 | Lu .................... G01B 5/061 |
| 9,746,305 B2 | 8/2017 | Lape et al. |
| 10,823,544 B2 * | 11/2020 | Xue .................... G01B 5/061 |
| 11,105,602 B2 * | 8/2021 | Xu .................... G01B 3/22 |
| 2020/0003540 A1 * | 1/2020 | Xue .................... G01B 5/061 |

FOREIGN PATENT DOCUMENTS

| | | |
|---|---|---|
| CN | 204630510 U | 9/2015 |
| CN | 206300628 U | 7/2017 |
| DE | 3801813 A1 | 8/1989 |

* cited by examiner

METHODS AND APPARATUS FOR DETERMINING A HEIGHT OF AN EDGE PORTION OF A PRODUCT

CROSS-REFERENCE TO RELATED APPLICATIONS

This application claims the benefit of priority under 35 U.S.C. § 119 of Chinese Patent Application Serial No. 201811305980.0 filed on Nov. 5, 2018 the content of which is relied upon and incorporated herein by reference in its entirety.

FIELD

The present disclosure relates generally to methods and apparatus for determining a height of an edge portion of a product and, more particularly, to methods and apparatus for measuring a height of an edge portion of a product with a probe.

BACKGROUND

Sheets of material (e.g., sheets of glass) are commonly incorporated into a device (e.g., an electronic device) as a sheet of display glass. In further embodiments, cover glass sheets can be provided to help prevent damage to the sheet of display glass. In some embodiments, there is a desire to provide such sheets of display glass and/or the cover glass sheets with one or more outer edge portions that comprising curved surfaces to enhance the functionality of the associated device and/or enhance the ability to protect curved portions of the display glass or other associated device components.

There is a need to help quickly align and determine the height at one or more locations along the edge portion of the product.

SUMMARY

There are set forth methods and apparatus for quickly determining a height of an edge portion of a product. The methods and apparatus allow the edge portion of the product to be quickly aligned along a determination axis. In some embodiments, alignment may be quickly obtained with a shoulder that can define the determination axis. When aligning, the product may be inserted such that the outermost edge of the edge portion of the product engages the shoulder to align the outer edge of the product with the determination axis. To avoid interference between a probe tip and the shoulder, the shoulder may be provided as a series of shoulder segments that may be spaced apart from one another wherein the spacing between adjacent shoulder segments can provide clearance for the probe tip. Such clearance can be beneficial to allow the probe tip to engage the highest point of the edge portion of the product, without interference with the shoulder, to determine the height of the edge portion of the product. In addition or in the alternative, the clearance can be beneficial to allow the probe tip to engage the support surface of the base to calibrate the probe to a zero height prior to determining the height of the edge portion of the product.

In some embodiments, a clamping pin may be provided to clamp a portion of the product against the support surface of the base to simulate an installed product. Once clamped, a height of the plurality of locations of the edge portion can be determined to simulate the height of the product in an installed orientation. Alternatively, the height of the plurality of locations of the edge portion can be determined prior to clamping to simulate the height of the product in a free state orientation when the product is not installed. Determining the height of one or more locations of the edge portion of the product can help ensure the height remains within a desired height range to maintain product quality, for example, minimized warpage and/or desired assembly fitness.

Some embodiments of the disclosure can provide a probe that can pass through an aperture in support arm that supports a clamping pin. Such a configuration can allow the probe tip axis to be aligned with a clamping pin axis in a direction perpendicular to a determination axis. Such alignment can position the probe tip contact location behind the location of the edge portion being contacted by the probe tip to enhance flattening of the product at the location of the edge portion being contacted by the probe tip. As such, a better simulation can be achieved of the installed product and, consequently, a better simulation of the height of the edge portion at the location when the product is installed. Furthermore, providing a probe tip that can pass through the aperture of the support arm for the clamping pin can provide a more compact clamping pin and probe tip configuration, thereby allowing a higher density of determinations to be made along a given length of the edge portion of the product.

Embodiment 1

An apparatus can comprise a base comprising a support surface comprising a product support area. The apparatus can further comprise a probe movable in a direction along a probe axis that intersects a determination axis. The apparatus can still further comprise a clamping pin movable along a clamping pin axis that intersects the product support area.

Embodiment 2

The apparatus of embodiment 1, wherein the determination axis can be linear.

Embodiment 3

The apparatus of any one of embodiments 1 and 2, wherein a shoulder can define the determination axis.

Embodiment 4

The apparatus of embodiment 3, wherein the shoulder can comprise a plurality of shoulder segments spaced apart from one another.

Embodiment 5

The apparatus of embodiment 4, wherein the probe axis can extend within a space defined between a corresponding pair of segments of the plurality of shoulder segments.

Embodiment 6

The apparatus of any one of embodiments 1-5, wherein the probe axis and the clamping pin axis may be aligned in a direction perpendicular to the determination axis.

Embodiment 7

The apparatus of any one of embodiments 1-6, wherein the clamping pin can be supported by a support arm.

Embodiment 8

The apparatus of embodiment 7, wherein a spring can bias the clamping pin to an extended position relative to the support arm.

Embodiment 9

The apparatus of any one of embodiments 7 and 8, wherein the probe can be movable through an opening defined by the support arm.

Embodiment 10

The apparatus of any one of embodiments 1-9, wherein the probe can comprise a probe tip comprising a substantially flat engagement surface.

Embodiment 11

The apparatus of embodiment 10, wherein the substantially flat engagement surface can be parallel to a substantially flat portion of the support surface.

Embodiment 12

The apparatus of any one of embodiments 1-11, wherein the probe axis can be perpendicular to the determination axis.

Embodiment 13

The apparatus of any one of embodiments 1-12, wherein the probe can comprise a plurality of probes spaced apart from one another along the determination axis.

Embodiment 14

The apparatus of embodiment 13, wherein the clamping pin can comprise a plurality of clamping pins, and each clamping pin of the plurality of clamping pins can be aligned with a corresponding probe of the plurality of probes.

Embodiment 15

A method of determining a height of an edge portion of a product can comprise placing the product on a product support area of a support surface of a base. The method can further comprise aligning the edge portion of the product along a determination axis. The method can further comprise clamping the product to the base at a clamping location of the product positioned over the product support area. The method can further comprise extending a probe to contact a location of the edge portion of the product while the product is clamped to the base. The method can further comprise determining a height of the edge portion of the product based on the position of the probe contacting the edge portion of the product.

Embodiment 16

The method of embodiment 15, wherein the probe can comprise a probe tip comprising a substantially flat engagement surface. Furthermore, extending the probe to contact the edge portion of the product can contact the substantially flat engagement surface of the probe tip with the edge portion of the product.

Embodiment 17

The method of any one of embodiments 15-16, wherein clamping the product to the base can flatten the product against the product support area at the clamping location.

Embodiment 18

The method of any one of embodiments 15-17, wherein the clamping location can be aligned with the location of the edge portion contacted by the probe along a direction perpendicular to an outer edge of the edge portion.

Embodiment 19

The method of any one of embodiments 15-18, wherein clamping the product to the base can comprise moving a clamping pin to contact the product at the clamping location to press the product against the base at the clamping location.

Embodiment 20

The method of embodiment 19, wherein extending the probe can comprise moving the probe through an opening defined by a support arm that supports the clamping pin.

Embodiment 21

A method of determining a height profile of an edge portion of a product can comprise placing the product on a product support area of a support surface of a base. The method can further comprise aligning the edge portion of the product along a determination axis and clamping the product to the base at a plurality of clamping locations of the product positioned over the product support area. The method can further comprise extending a plurality of probes to contact a corresponding location of a plurality of locations of the edge portion of the product while the product is clamped to the base. The method can further comprise determining a height of the edge portion of the product at each location of the plurality of locations of the edge portion based on the corresponding position of each probe of the plurality of probes.

Embodiment 22

The method of embodiment 21, wherein each probe of the plurality of probes can comprise a probe tip comprising a substantially flat engagement surface. Furthermore, extending the plurality of probes can contact the substantially flat engagement surface of each probe tip of the plurality of probes with the corresponding location of the plurality of locations of the edge portion of the product.

Embodiment 23

The method of any one of embodiments 21-22, wherein clamping the product to the base can flatten the product against the product support area at the plurality of clamping locations.

Embodiment 24

The method of any one of embodiments 21-23, wherein the clamping location of each of the plurality of clamping locations can be aligned with a corresponding location of the plurality of locations of the edge portion along a direction perpendicular to an outer edge of the edge portion.

Embodiment 25

The method of any one of embodiments 21-24, wherein clamping the product to the base can comprise moving a plurality of clamping pins to contact the product at the plurality of clamping locations to press the product against the base at the plurality of clamping locations.

Embodiment 26

The method of embodiment 25, wherein extending the plurality of probes can comprise moving each probe of the plurality of probes through an opening defined by a corresponding support arm that supports a corresponding clamping pin of the plurality of clamping pins.

BRIEF DESCRIPTION OF THE DRAWINGS

The above and other features and advantages of embodiments of the present disclosure are better understood when the following detailed description is read with reference to the accompanying drawings, in which.

DETAILED DESCRIPTION

Embodiments will now be described more fully hereinafter with reference to the accompanying drawings in which exemplary embodiments are shown. Whenever possible, the same reference numerals are used throughout the drawings to refer to the same or like parts. However, claims may encompass many different aspects of various embodiments and should not be construed as limited to the embodiments set forth herein.

Figure 1:
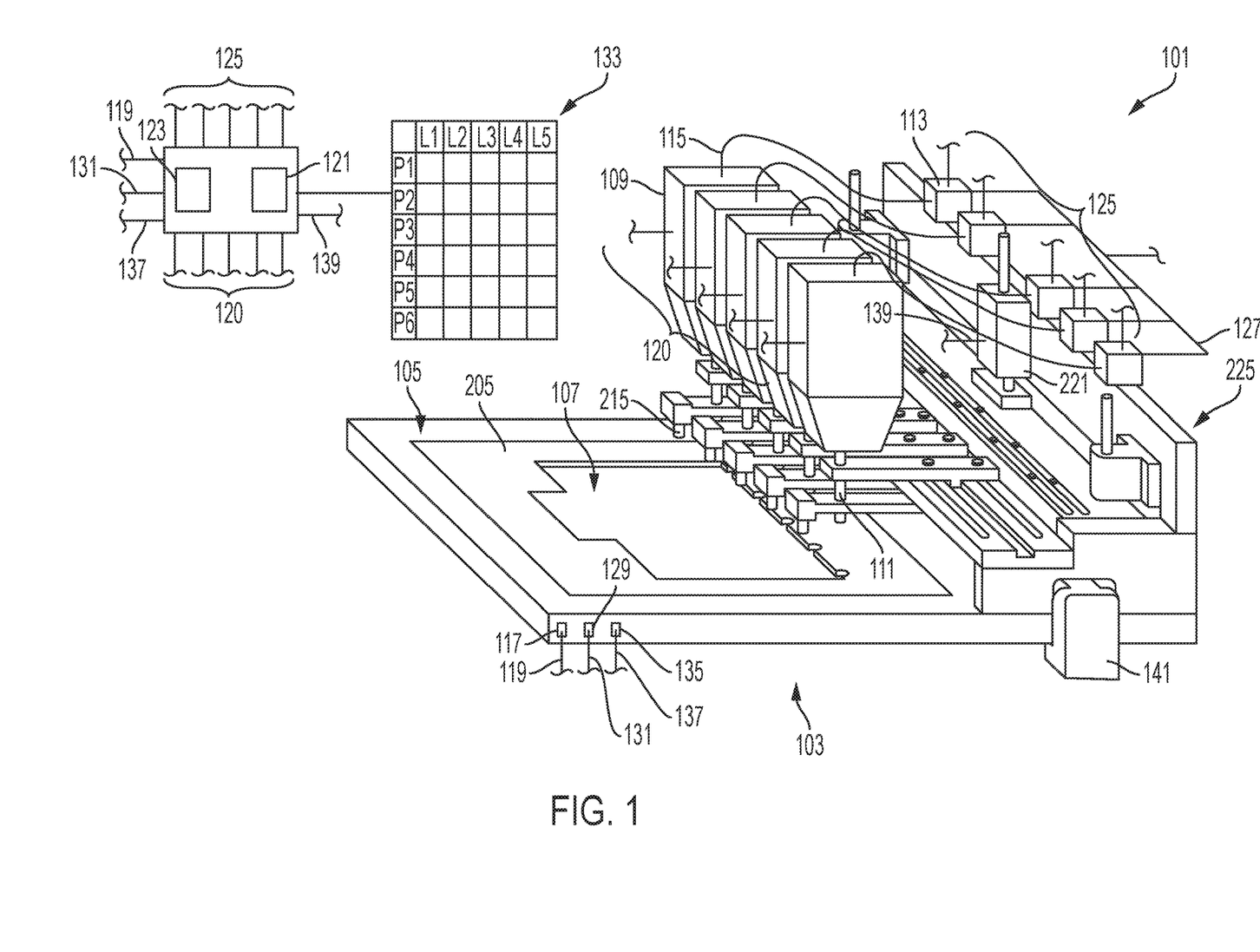
FIG. 1 is a schematic perspective view of an apparatus for determining a height of an edge portion of a product in accordance with embodiments of the disclosure.

FIG. 1 illustrates apparatus 101 for determining a height of an edge portion of a product. The apparatus 101 may determine the edge height of edge portions of various products, for example, display sheets, protective cover sheets or other types of sheet products. In some embodiments the sheets may comprise glass, glass-ceramic, sapphire, plastic or other types of material. In some embodiments, the thickness of the sheet (e.g., thickness of the protective cover glass sheet 601 discussed below) can be from about 50 microns to about 1 millimeter, for example from about 50 microns to about 500 microns or from about 50 microns to about 300 microns although other thicknesses may be provided in further embodiments. For instance, in some embodiments, the sheet may have a thickness of ≤500 microns, ≤300 microns, ≤200 microns, or ≤100 microns.

Figure 6:
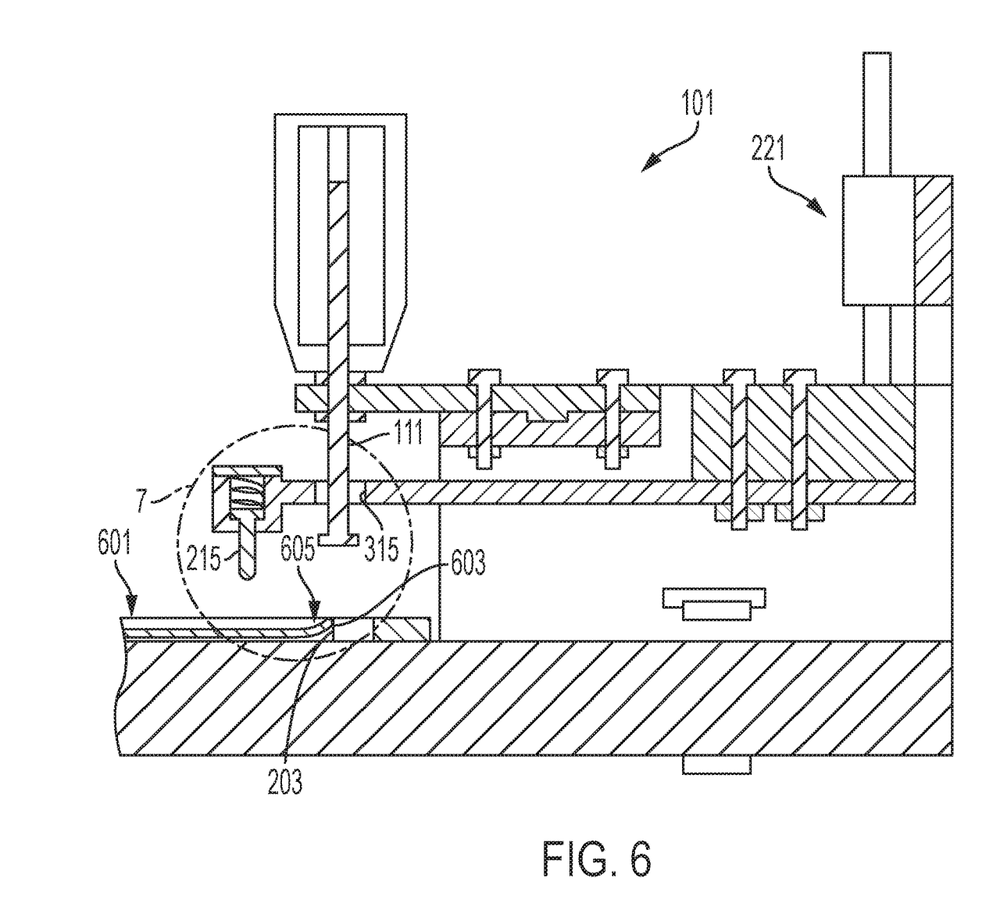
FIG. 6 is a schematic cross-sectional view of the apparatus similar FIG. 3 but showing a product being aligned along a determination axis.
Figure 7:
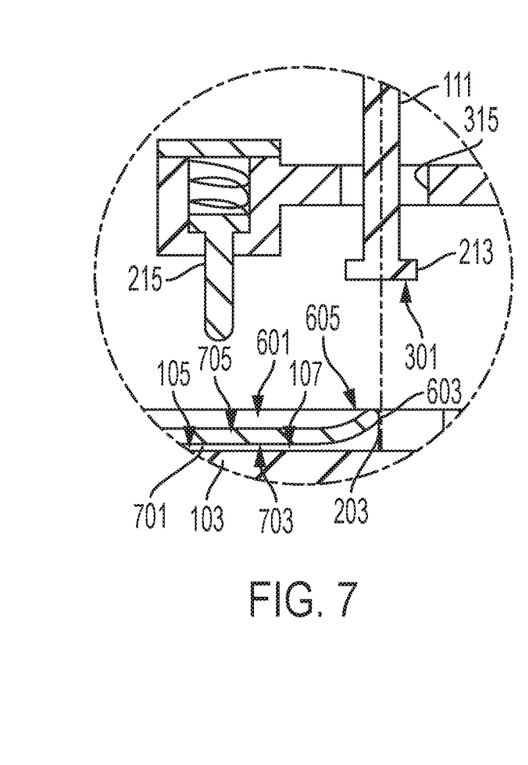
FIG. 7 is an enlarged view of a portion of the apparatus taken at view 7 of FIG. 6.

For purposes of illustration, the product is illustrated as a protective cover glass sheet 601 shown in FIGS. 6-7. As shown in FIG. 7, the protective cover glass sheet 601 comprises a first major surface 703 and a second major surface 705 with the thickness of the protective cover glass sheet defined between the first major surface 703 and the second major surface 705. As further illustrated, the protective cover glass sheet 601 further comprises an edge portion 605 including an outer edge 603. The outer edge 603 is considered the outermost extend of the edge portion 605 and may comprise a linear outer edge 603 in some embodiments. For purposes of this application, the edge portion 605 is considered the portion of the protective cover glass sheet 601 that is located less than or equal to 5 millimeters from the outer edge 603.

As shown, the outer edge may comprise portions of the first major surface 703 and the second major surface 705 that are curved. For instance, as shown, the edge portion 605 may comprise a convex portion of the first major surface 703 and a concave portion of the second major surface 705. Although only a single side of the protective cover glass sheet 601 is shown with an edge portion 605 that comprises curved surfaces, in some embodiments a plurality of edges, such as all edges of the protective glass sheet 601 may comprise an edge portion 605 that comprises curved surfaces such as the curved surfaces illustrated in FIG. 7 and described above. In some embodiments, the protective cover glass sheet 601 comprises four edges although three edges or more than four edges may be provided in further embodiments. In embodiments with four edges, the edge portion 605 with curved surfaces such as the curved surfaces illustrated in FIG. 7 described above may be provided in one edge, two edges, three edges or all four edges of the protective cover glass sheet 601. In some embodiments, opposite edge portions 605 of the protective cover glass sheet 601 can comprise curved surfaces such as the curved surfaces illustrated in FIG. 7.

In some embodiments, protective cover glass sheets may be installed (e.g., mounted) on a display device (e.g., a portable display device), for example, a portable computer (e.g., portable tablet), a smartphone or other display device. Determining the height of one or more edge portions of the product (e.g., edge portion(s) of a protective cover glass sheet) can be helpful to provide dimension control which can impact multiple aspects of the product quality, for example, warpage and assembly fitness.

The apparatus 101 can comprise a base 103 comprising a support surface 105 comprising a product support area 107. In some embodiments, the base 103 can comprise a slab of material capable of resisting deformation and retaining a consistent support surface 105 (e.g., substantially flat support surface). The illustrated support surface 105 comprises a substantially flat support surface. For purposes of this application, flatness of the support surface can be measured by a coordinate measuring machine (CMM). In some embodiments, the flatness of the support surface 105 can be 10 micrometers or less. The slab of material can comprise stone (e.g., marble), metal (e.g. stainless steel) or other materials that can be worked (e.g., machined) to provide the desired flatness. Furthermore, in some embodiments, the slab of material can comprise a monolithic body of substantial mass and proper mounting to improve determination by avoiding movement from outside forces that may otherwise shake or vibrate the base 103.

Figure 2:
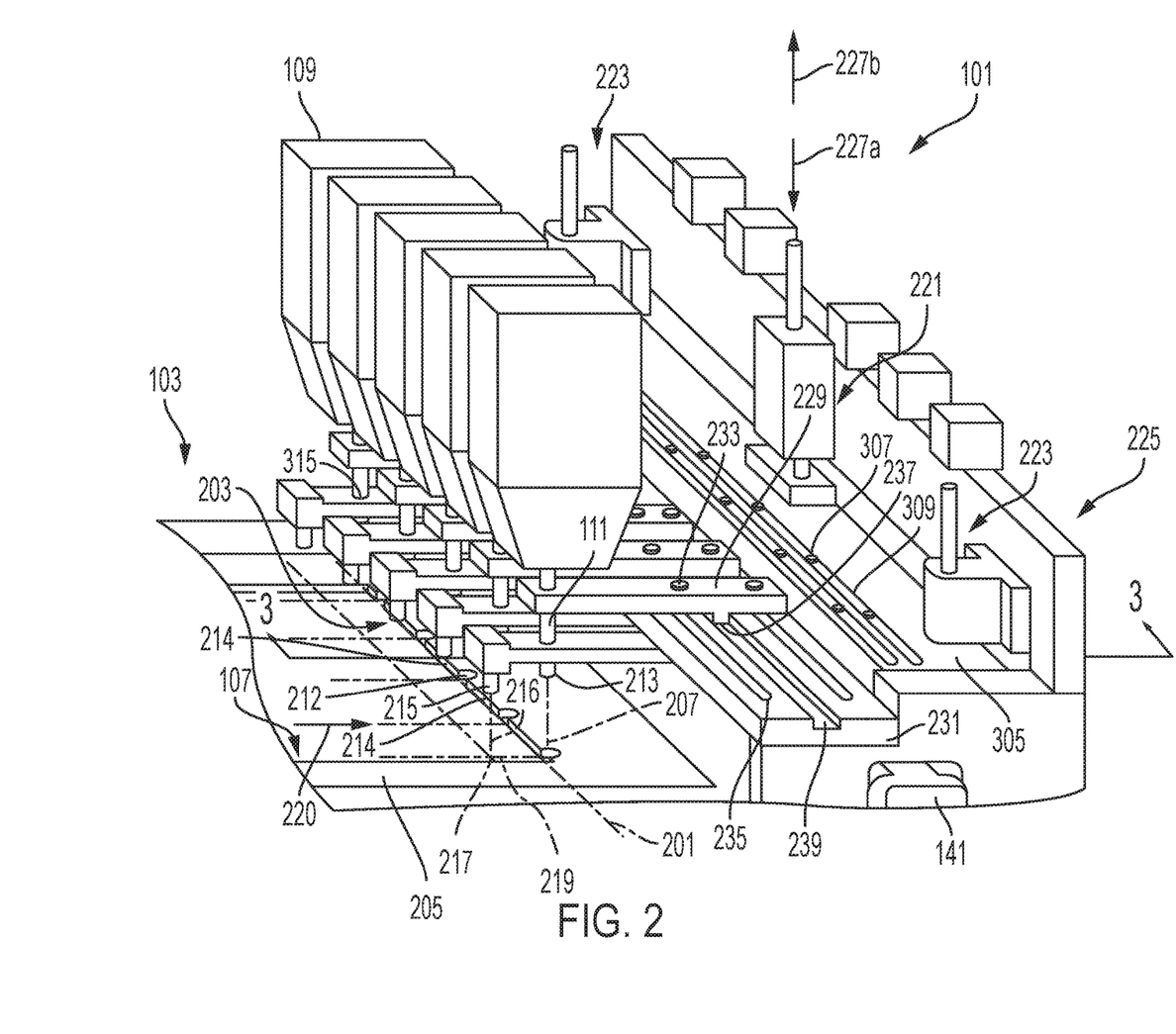
FIG. 2 is an enlarge schematic perspective view of a portion of the apparatus of FIG. 1.

In some embodiments, with reference to FIG. 2, the apparatus 101 can further comprise a determination axis 201. As shown, the determination axis 201 can comprise a linear determination axis 201 that may be employed for products 601 that comprise a linear outer edge 603 (see FIG. 6) of the edge portion 605 that extend along the linear determination axis 201. In some embodiments, the determination axis may comprise a curved axis or other shape designed to match the shape of the outer edge of the outer edge portion of the product. With further reference to FIG. 2, in some embodiments, the apparatus 101 can comprise a shoulder 203 that can define the determination axis 201. In some embodiments, as shown, the shoulder 203 can be provided by a product locator, for example, the illustrated frame 205 that partially or entirely circumscribes the product support area 107 of the support surface 105 of the base 103. In some embodiments, the frame 205 can be temporarily or permanently attached to the support surface 105 of the base 103 to fix the location of the determination axis 201 relative to the base 103. In some embodiments, the frame 205 may be temporarily fixed to allow removal of the frame and replacement with another frame designed to receive products of different dimensions. Furthermore, the frame 205 may be designed to receive the same product in different orientations, for example, orientations rotated 90° or 180° relative to the product support area 107.

Figure 3:
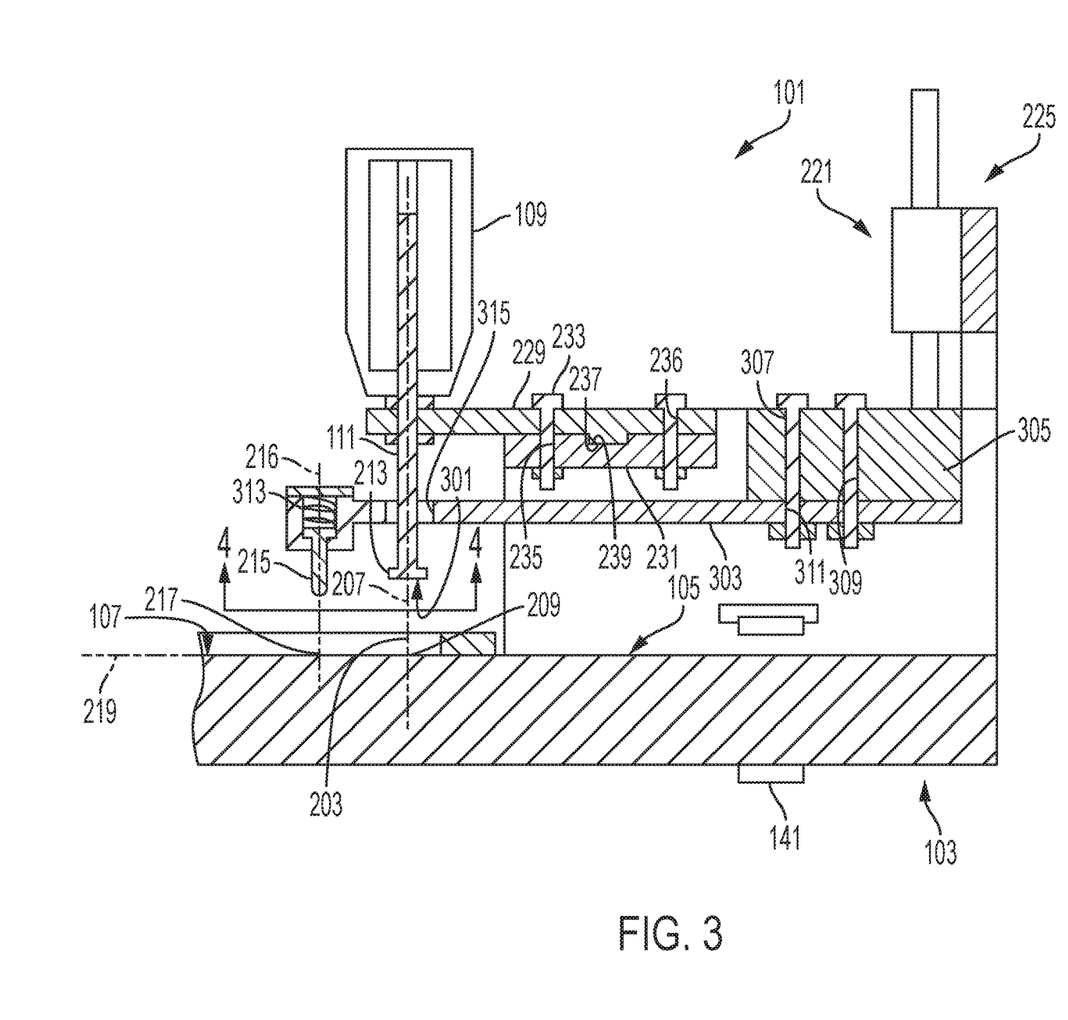
FIG. 3 is a schematic cross-sectional view of the apparatus taken along section line 3-3 of FIG. 2.

In further embodiments, with reference to FIG. 1, the apparatus 101 can further comprise one or more gauges. As illustrated, in some embodiments, the one or more gauges 109 can comprise a digital micrometer including a probe 111 that may be extended and retracted by way of fluid cylinders 113 (e.g., air cylinders or liquid cylinders). A fluid source (not shown), for example, a fluid pump, pressurized fluid container may provide pressurized fluid to fluid cylinders 113. Fluid cylinders 113 may be operated by a controller to apply fluid pressure to the gauge 109 (e.g., digital micrometer) by way of fluid conduits 115 to extend or retract the probes 111 depending on the pressure applied by the fluid. Referring to FIGS. 2 and 3, the one or more gauges 109 can be supported by a gauge support arm 229. The gauge support arm 229 can be fixedly attached to a gauge support beam 231 by bolts 233 extending through adjustment slots 235 of the gauge support beam 231 and aligned apertures 236 of the gauge support arm 229. With such an arrangement, the gauge support arm 229 provides a cantilever support for the gauge 109. Furthermore, with reference to FIG. 2, the adjustment slots 235 can allow a lateral adjustment of gauge support arm 229 and corresponding gauge 109 to provide a customized lateral positioning of the gauge 109 relative to the product support area 107 depending on the features of the product to be analyzed. Still further, one of the gauge support arm 229 and the gauge support beam 231 can comprise a tongue 237 and the other of the gauge support arm 229 and the gauge support beam 231 can comprise a groove 239 to matingly receive the tongue 237 help prevent inadvertent movement of the gauge relative to the base 103 once the position of the gauge 109 is fixed relative to the base 103.

Referring to FIG. 2, the probe 111 may be movable in a direction along a probe axis 207 that can intersect the determination axis at location 209 (see FIG. 3) of the determination axis 201. To provide clearance for a probe tip 213 of the probe 111, the shoulder may comprise a plurality of shoulder segments 214 that may be spaced apart from one another such that a space 212 can be provided between a pair of adjacent shoulder segments 214. As shown, the space 212 can be provided by a semi-circular notch in the frame 205 although other notch shapes can be provided in further embodiments. As illustrated, the probe axis 207 can extend within the space 212 defined between a corresponding pair of segments of the plurality of shoulder segments 114 and intersect the determination axis 201 in the space 212 between the shoulder segments 214. As further shown in FIGS. 2-3, the probe axis 207 can also be perpendicular to the determination axis 201. Furthermore, a substantially flat engagement surface 301 (see FIG. 3) of the probe tip 213 can be parallel with the a substantially flat portion of the support surface 105 of the base 103. In some embodiments, the flatness of the engagement surface 301 can be 10 micrometers or less as measured by a coordinate measuring machine (CMM).

The apparatus 101 can still further comprise a clamping pin 215 supported by a clamping support arm 303. The clamping support arm 303 can be fixedly attached to a clamping support beam 305 by bolts 307 extending through adjustment slots 309 of the clamping support beam 305 and aligned apertures 311 of the clamping support arm 303. With such an arrangement, the clamping support arm 303 provides a cantilever support for the clamping pin 215. Furthermore, with reference to FIG. 2, the adjustment slots 309 can allow a lateral adjustment of clamping support arm 303 and corresponding clamping pin 215 to provide a customized lateral positioning of the clamping pin 215 relative to the product support area 107 depending on the features of the product to be analyzed. Although not shown, one of the clamping support arm 303 and the clamping support beam 305 can comprise a tongue and the other of the clamping support arm 303 and the clamping support beam 305 can comprise a groove to matingly receive the tongue help prevent inadvertent movement of the clamping pin 215 relative to the base 103 once the position of the clamping pin 215 is fixed relative to the base 103.

The clamping pin 215 can be movable along a clamping pin axis 216 that intersects the product support area 107 at clamping location 217. For example, an actuator 221 (see FIG. 2) can move the clamping support beam 305 together with the clamping support arms 303 and clamping pins 215 associated with the clamping support arms 303 from the unclamped position shown in FIG. 2 to the clamped position shown in FIGS. 10-13. Linear bearings 223 mounted between a support frame 225 and the clamping support beam 305 provide linear movement of the clamping support beam 305 along a clamping direction 227a or an unclamping direction 227b that extend along the clamping pin axis 216 and the probe axis 207 and substantially perpendicular to the support surface 105 of the base 103. Therefore, the clamping pin 215 may be movable along the clamping pin axis 216 by way of the actuator 221.

In some embodiments, a spring 313 can bias the clamping pin 215. For instance, as shown in FIG. 3, the spring 313 can bias the clamping pin 215 to an extended position relative to the clamping support arm 303 when the clamping support arm 303 is in the unclamped position. As shown in FIGS. 10-13, the spring 313 can move relative to the clamping support arm 303, along the clamping pin axis 216 to a clamped position that partially compresses the spring 313. The spring 313 can help the clamping pin 215 apply a predetermined force to the product that can be based on the spring constant of the spring. Furthermore, such predetermined force can be more accurately applied since the clamping support arm 303 can be moved within a range of positions along the clamping pin axis 216 that the clamping pin may be designed to move relative to the clamping support arm 303 while still providing substantially the same force to the product. As such, an exact positioning of the clamping support arm 303 is not necessary to achieve the desired force applied by the clamping pin 215 since the spring 313 allows the clamping pin 215 to apply a constant force as the clamping pin 215 moves relative to the clamping support arm 303 to compress the spring 313.

Figure 4:
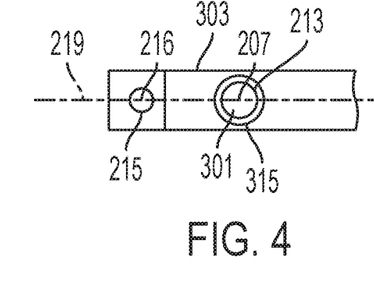
FIG. 4 is a view of the apparatus along line 4-4 of FIG. 3.

As shown in FIG. 2, in some embodiments, the probe axis 207 and the clamping pin axis 216 can be aligned in a direction 220 of an alignment axis 219 that may be perpendicular to the determination axis 201. The alignment axis 219 is also shown in FIG. 3 and projected to the bottom view of the clamping pin 215 and probe tip 213 in FIG. 4. Such alignment of the probe axis 207 and the clamping pin axis 216 can locate the clamping pin directly behind the probe 111 to ensure proper clamping of the product at the location where the height is being determined by the gauge 109. Furthermore, such alignment of the probe axis 207 and the clamping pin axis 216 can allow a more compact positioning of the probe 111 and the opening 315 to allow more locations of determination of the edge portion of the product. As shown in FIG. 4, the flat engagement surface 301 of the probe tip can include a circular flat engagement surface although other shapes can be provided in further embodiments. If circular, the diameter of the flat engagement surface 301 can be within a range of about 3 millimeters (mm) to about 8 mm although other diameters may be provided in further embodiments. In addition or alternatively, in some embodiments, the surface area of the flat engagement surface 301 can be within a range of from about 7 mm$^2$ to about 50 mm$^2$ although other surface areas may be provided in further embodiments.

As further shown in FIG. 3, the probe 111 can be movable through an opening 315 defined by the clamping support arm 303. In some embodiments, as shown in FIGS. 2 and 4, the opening 315 can comprise an aperture that extends through the clamping support arm 303 and defined by an interior surface of the clamping support arm 303 that circumscribes the aperture. As shown in FIGS. 3-4, the center of the opening can pass through an axis, for example, a symmetrical center axis of the clamping support arm 303. Although not shown, the opening may alternative comprise a slot extending through one side of the clamping support arm 303. Providing the probe 111 to be movable though the opening 315 defined by the clamping support arm 303 can facilitate alignment of the probe axis 207 and the clamping pin axis 216 along the alignment axis 219.

Throughout embodiments of the disclosure, reference to the probe 111 can comprise a single probe or two or more probes. For instance, as shown in FIGS. 1-2, a plurality of gauges 109 can be provided that each comprises a corresponding probe 111 including features discussed more fully above. As shown, in some embodiments, each probe of the plurality of probes can be identical to one another. As shown, the plurality of probes 111 can be spaced apart from one another along the determination axis 201. Providing a plurality of probes, for example, one probe 111 for each desired location of height determination, can enhance the speed and accuracy of conducting multiple height determinations at various locations of the edge portion 605 of the product 601 along the determination axis 201.

Throughout embodiments of the disclosure, reference to the clamping pin 215 can comprise a single clamping pin or two or more clamping pins. For instance, as shown in FIGS. 1-2, a plurality of clamping pins can be provided including features discussed more fully above. Each clamping pin 215 of the plurality of clamping pins can be aligned with a corresponding probe 111 of the plurality of probes. For instance, the probe axis 207 of each probe 111 and the clamping pin axis 216 of each corresponding clamping pin 215 can be aligned in the direction 220 of the alignment axis 219 that may be perpendicular to the determination axis 201. Providing the plurality of clamping pins, for example, one clamping pin 215 for each desired location of determination, can enhance the accuracy of the determination of the height at each corresponding location of the edge portion while also enhancing the speed and accuracy of conducting multiple height determinations of the edge portion 605 of the product 601 along the determination axis 201.

As shown in FIGS. 1-3, the support frame 225 can provide a rigid support for the gauge support beam 231 and the clamping support beam 305 relative to the base 103. In some embodiments, the support frame 225 may be attached, such as rigidly attached by adhesive or clamping to avoid machining the base 103. For instance, each side of the support frame 225 may be clamped by way of clamps 141 to the base 103. Clamping the support frame 225 to the base 103 can simplify fabrication of the apparatus 101 without requiring machining apertures or other features into the base 103.

Figure 5:
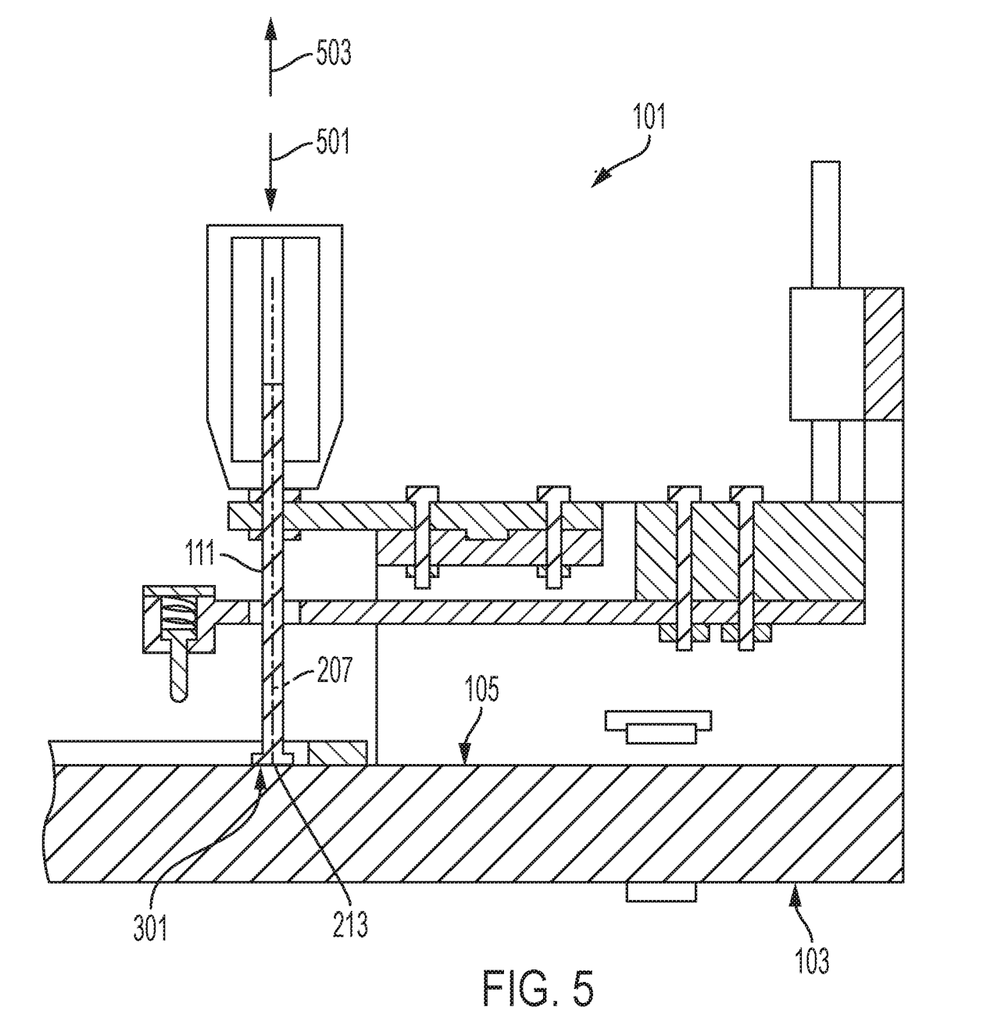
FIG. 5 is a schematic cross-sectional view similar to FIG. 3 but showing a substantially flat engagement surface of a probe tip engaging a substantially flat portion of a support surface of a base.

Methods of determining a height of an edge portion of the product will be initially discussed with reference to FIGS. 1 and 4. As shown, the one or more probes 111 can be retracted to an initial position and the corresponding one or more clamping pins 215 can be retracted to an unclamped position. In some embodiments, a calibration switch 117 may be engaged that sends a signal by way of communication line 119 to a control device 121 (e.g., programmable logic controller). The control device 121 can be configured to (e.g., "programmed to", "encoded to", designed to", and/or "made to") send a signal to the fluid cylinders 113 by way of communication lines 125. The fluid cylinders 113 can pass pressurized fluid from pressurized lines 127 to the gauges 109 by way of fluid conduits 115. The pressurized fluid from the fluid conduits 115 extend the probes 111 in the extension direction 501 along the probe axis 207 of each probe until the substantially flat engagement surface 301 of the probe tip 213 engages the substantially planar support surface 105 of the base 103 as shown in FIG. 5. Signals can then be sent along communication lines 120 to a processor 123 for calibrating each of the gauges to a zero height in the position shown in FIG. 5 where the substantially flat engagement surface 301 of the probe tip 213 engages the substantially planar support surface 105 of the base 103. Once calibrated to zero, the control device 121 (e.g., programmable logic controller) can be configured to (e.g., "programmed to", "encoded to", designed to", and/or "made to")

again send signals to the fluid cylinders 113 to cause the one or more probes to be retracted in a retraction direction 503 to the initial position shown in FIGS. 1 and 4. Operation of the calibration switch 117 to calibrate the gauges to zero can be conducted prior to each height determination or periodically after conducting a height determination operation for a plurality of products.

Methods of determining the height of the edge portion at one or more locations of the edge portion can further comprise placing the product (e.g., protective cover glass sheet 601) on the product support area 107 of the support surface 105 of the base 103. Such placement can comprise a manual placement or automatic placement. For example, automatic placement may use a robot to pick and place the product in position. Methods can further comprise aligning the edge portion 605 of the product along the determination axis 201. For instance, as shown in FIG. 7, the product may be moved until the outer edge 603 of the product 601 touches the shoulder 203 wherein the engagement of the outer edge 603 of the edge portion 605 of the product 601 with the shoulder 203 can properly align the edge portion 605 along the determination axis 201. As shown in FIG. 7, the edge portion 605 may be curved in a direction outwardly from the support surface 105 of the base 103. As shown in FIG. 7, once aligned, a space 701 may exist between the product support area 107 of the support surface 105 of the base 103 due to warping or other characteristics of the product (e.g., protective cover glass sheet 601).

Figure 8:
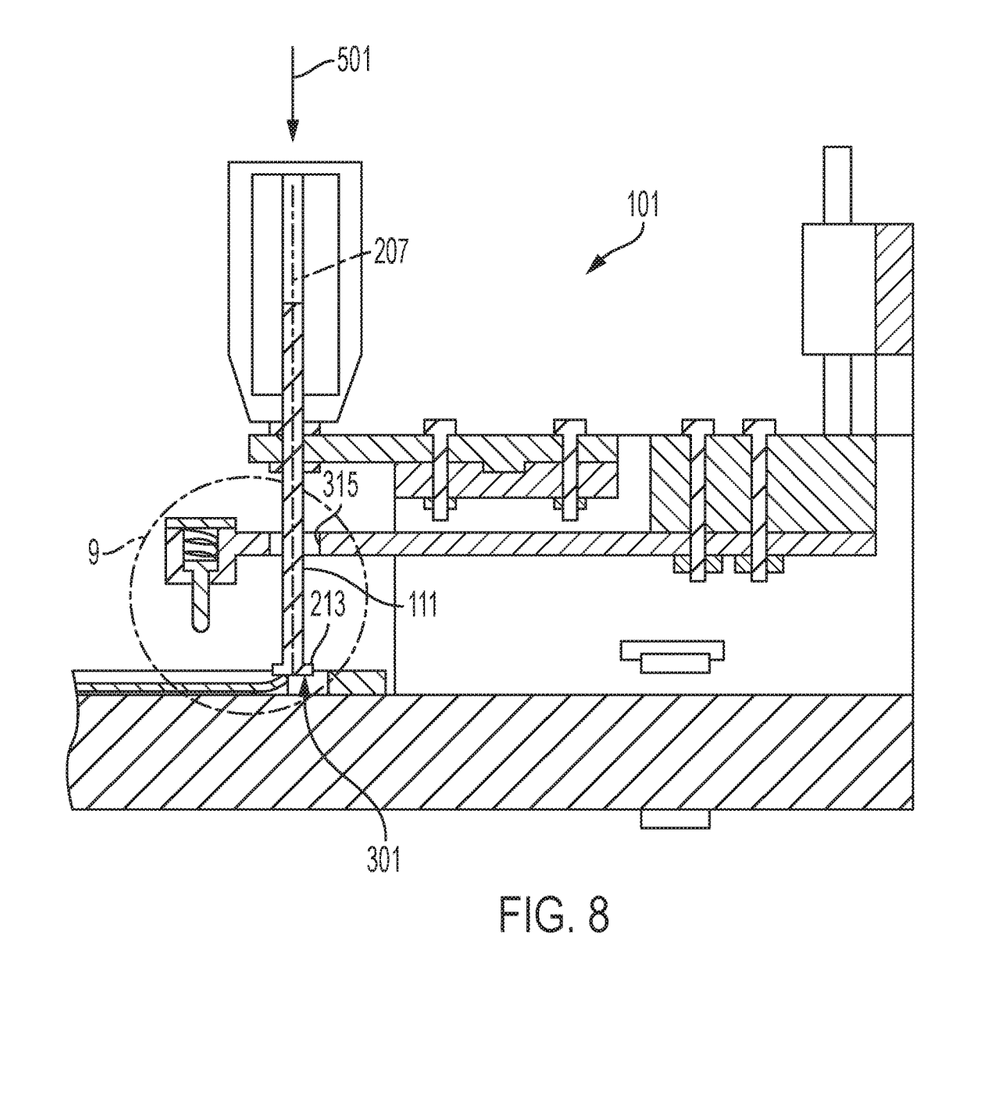
FIG. 8 is a schematic cross-sectional view of the apparatus similar to FIG. 3 but showing a probe being extended to contact a highest point on the edge portion of the product while the product is aligned along the determination axis.
Figure 9:
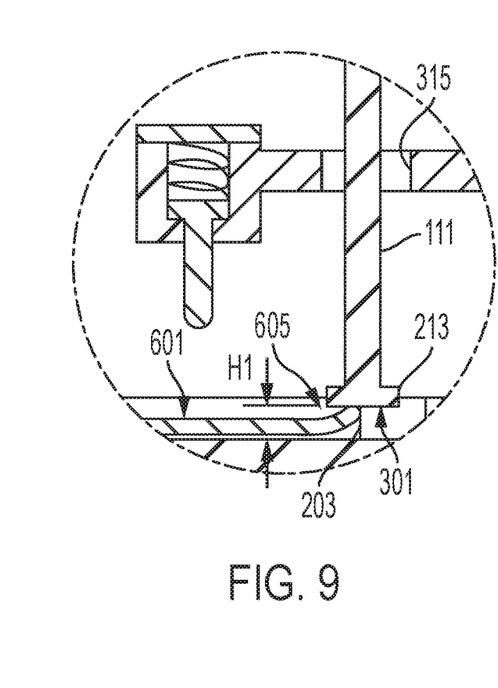
FIG. 9 is an enlarged view of a portion of the apparatus taken at view 9 of FIG. 8.

In some embodiments, the height of the edge portion 605 of the product 601 at one or more locations of the edge portion 605 may be determined in its free state, where the product 601 is simply aligned on the product support area 107 without clamping the product. The free state simulates the height of the edge portion 605 prior to installation on another product (e.g., a handheld electronic device). To determine the height of the edge portion 605 when the product is not clamped (as shown in FIG. 6), a gauge switch 129 can be activated to send a signal to control device 121 (e.g., programmable logic controller) by way of communication line 131. Based on the signal received from the communication line 131, the control device 121 (e.g., programmable logic controller) can be configured to (e.g., "programmed to", "encoded to", designed to", and/or "made to") send signals to the fluid cylinders 113 by way of communication lines 125. The fluid cylinders 113 can pass pressurized fluid from pressurized lines 127 to the gauges 109 by way of fluid conduits 115. The pressurized fluid from the fluid conduits 115 can extend the probes 111 in the extension direction 501 along the probe axis 207 of each probe to move the probe 111 through the opening 315 defined by the clamping support arm 303 that supports the clamping pin 215. The probes 111 can continue to move in the extension direction until the substantially flat engagement surface 301 of the probe tip 213 of each probe 111 engages the highest point of the corresponding location of the edge portion 605 aligned with the footprint of the substantially flat engagement surface 301 as shown in FIGS. 8-9. Signals can then be sent along communication lines 120 to a processor 123 for determining the height "H1" of each location associated with each probe 111 (i.e., the highest point of the location of the edge portion at each location). In some embodiments "H1" can be from about 50 micrometers to about 10 millimeters although other heights may be provided in further embodiments. In addition or alternatively, the height "H1" can be from greater than 1 to about 10 times the thickness of the product 601 although still other heights may be provided in further embodiments. This information can be stored in a database 133. In some embodiments, as shown, the database can be arranged in a spreadsheet format for outputting from a printer or on a computer screen. For instance, as shown in FIG. 1, each row (e.g., P1-P6) can represent the product number and each column can represent a corresponding location (e.g., L1-L5) of the edge portion 605 along the determination axis 201. In the illustrated embodiment, a height profile of the edge portion 605 can comprise the height "H1" at each of the locations L1-L5. This information can be used to identify products with edge portion locations having unacceptable maximum and/or minimum heights or can provide product information that may be used to further refine the process of fabricating the products or using the products (e.g., as a cover glass sheet for an electronic device).

In some embodiments, the height of the edge portion 605 of the product 601 at one or more locations of the edge portion 605 may be determined in its clamped state, where the product is aligned on the product support area 107 while clamping the product against the product support area 107 of the support surface 105 of the base 103 to flatten the product 601 against the product support area 107 at the clamping location 217. The clamped state can be designed to simulate the height of the edge portion 605 after installation on another product (e.g., a handheld electronic device). To achieve the clamped state, a switch 135 may be activated to send a signal to the control device 121 (e.g., programmable logic controller) by way of communication line 137. Based on the signal received from the communication line 137, the control device 121 can be configured to (e.g., "programmed to", "encoded to", designed to", and/or "made to") again send signals to the actuator 221 by way of communication line 139 to cause the clamping support beam 305 together with the one or more clamping support arms 303 fixedly attached to the clamping support beam 305 and the associated one or more clamping pins 215 to move in a direction 1001 (See FIG. 10) along the clamping pin axis 216 toward the one or more clamping locations 217 associated with each clamping pin 215. The tip of each clamping pin 215 can contact a corresponding clamping location 1003 of the second major surface 705 of the product 601 positioned over the product support area 107 to press the first major surface 703 of the product 601 (e.g., protective cover glass sheet) against the product support area 107 of the planar support surface 105 of the base 103 at each of the clamping locations 217. Each clamping location 217 can be aligned with each location of the edge portion 605 to be measured along the alignment axis 219 in the direction 220 perpendicular to the determination axis 201. Such alignment can ensure that the product is fully clamped at the one or more locations of the edge portion 605 of the product 601, thereby simulating the relative position of each determination location of the edge portion 605 of the product 601 (e.g., protective cover glass sheet) when installed on another product (e.g., portable electronic device).

Figure 10:
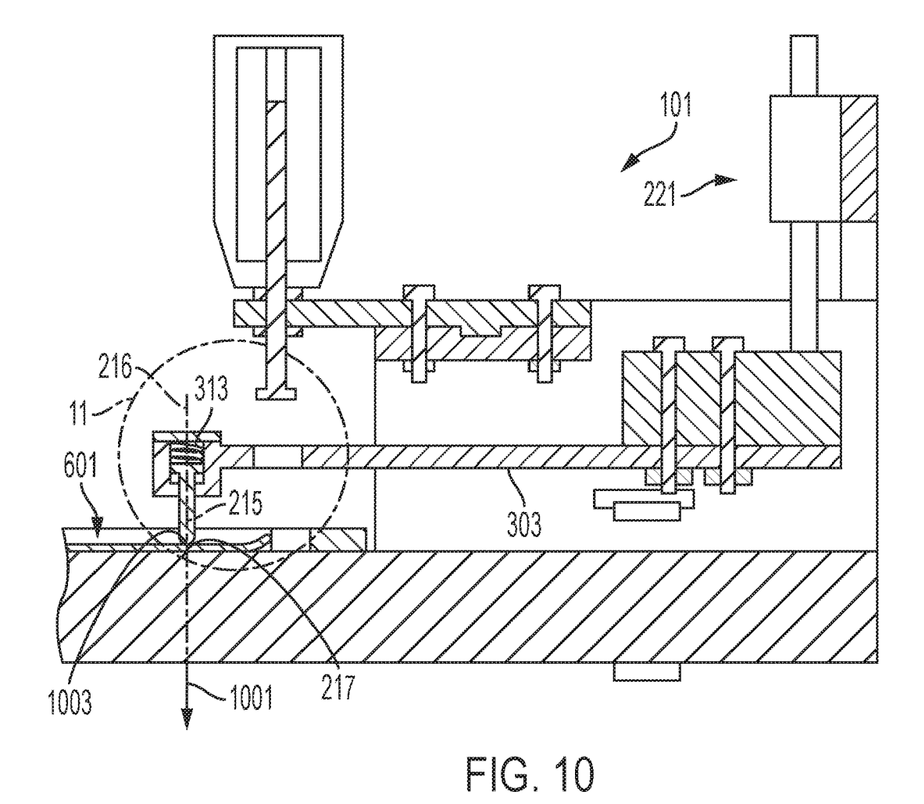
FIG. 10 is a schematic cross-sectional view of the apparatus similar to FIG. 6 but showing the product being clamped to the base at a clamping location of the product while the product is aligned along the determination axis.
Figure 11:
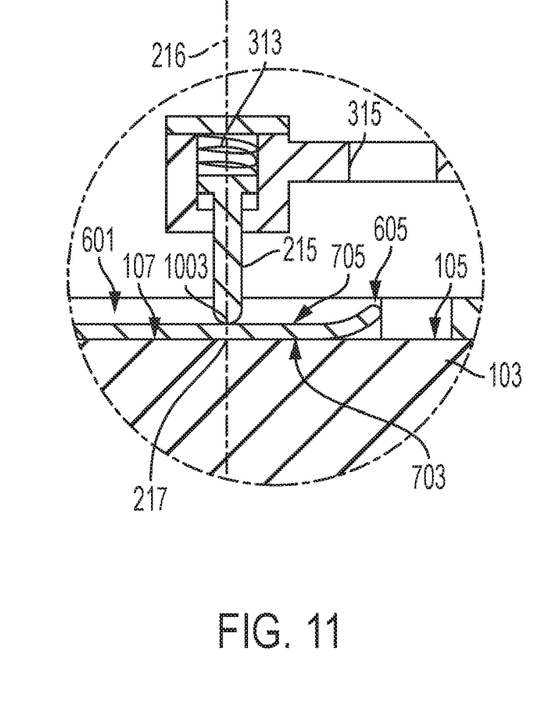
FIG. 11 is an enlarged view of a portion of the apparatus taken at view 11 of FIG. 10.
Figure 12:
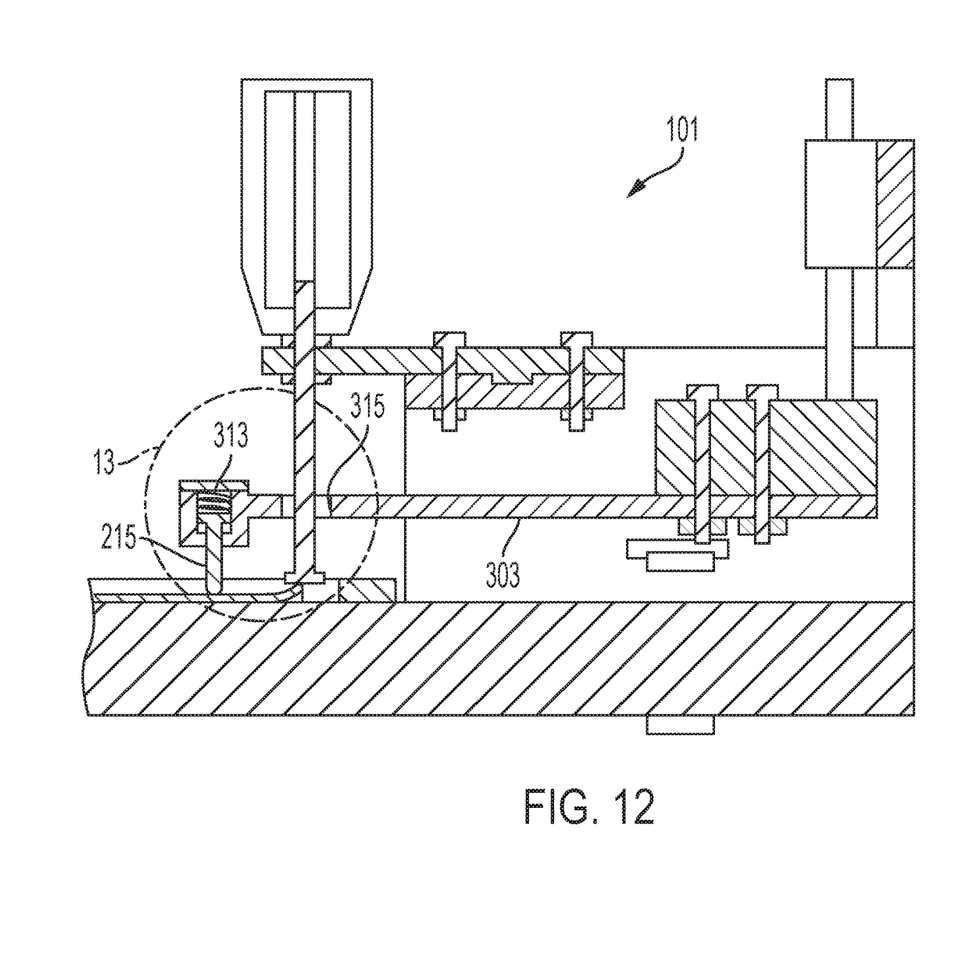
FIG. 12 is a schematic cross-sectional view of the apparatus similar to FIG. 10 but showing the probe being extended to contact a highest point on the edge portion of the product while the product is clamped to the base and aligned along the determination axis.
Figure 13:
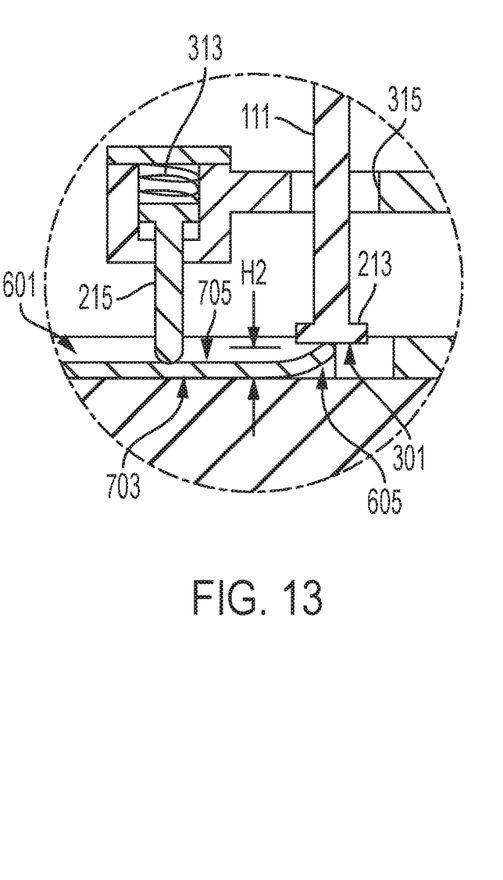
FIG. 13 is an enlarged view of a portion of the apparatus taken at view 13 of FIG. 12.

To determine the height of the edge portion 605 when the product is clamped (as shown in FIG. 10-11), the gauge switch 129 can be activated to send a signal to control device 121 (e.g., programmable logic controller) by way of communication line 131. Based on the signal received from the communication line 131, the control device 121 can be configured to (e.g., "programmed to", "encoded to", designed to", and/or "made to") send signals to the fluid cylinders 113 by way of communication lines 125. The fluid cylinders 113 can pass pressurized fluid from pressurized lines 127 to the gauges 109 by way of fluid conduits 115. The pressurized fluid from the fluid conduits 115 can extend the probes 111 in the extension direction 501 along the probe axis 207 of each probe to move the probe 111 through the opening 315 defined by the corresponding clamping support arm 303 that supports the corresponding clamping pin 215. The probes 111 can continue to move in the extension direction until the substantially flat engagement surface 301 of the probe tip 213 of each probe 111 engages the highest point of each corresponding location of the edge portion 605 aligned with the footprint of each substantially flat engagement surface 301 as shown in FIGS. 12-13. Signals can then be sent along communication lines 120 to a processor 123 for determining the height "H2" of each location (i.e., the highest point of each location of the edge portion). As shown, "H2" is less than or equal to "H1". In some embodiments, "H2" can be from about 50 micrometers to about 10 millimeters although other heights may be provided in further embodiments. In addition or alternatively, the height "H2" can be from greater than 1 to about 10 times the thickness of the product 601 although still other heights may be provided in further embodiments. This information can be stored in a database 133 as discussed above. For instance, as discussed above, the database can be arranged in a spreadsheet format for outputting from a printer or on a computer screen. For instance, as shown in FIG. 1, each row (e.g., P1-P6) can represent the product number and each column an represent the location (e.g., L1-L5) of the edge portion 605 along the determination axis 201. In the illustrated embodiment, a height profile of the edge portion 605 can comprise the height at each of the locations L1-L5. This information can be used to identify products with locations that comprise unacceptable maximum and/or minimum heights or can provide product information that may be used to further refine the process of fabricating the products or using the products (e.g., as a cover glass sheet for an electronic device).

In some embodiments, the apparatus 101 can be used to conduct two height determinations on each product. One determination can measure one or more locations of the edge portion 605 of the product 601 in its free state (see FIGS. 8-9), where the product is simply aligned on the product support area 107 without clamping the product, thereby simulating the height of the edge portion 605 prior to installation on another product (e.g., a handheld electronic device). Another determination can measure the one or more locations of the edge portion 605 of the product 601 again but in its clamped state (see FIGS. 12-13), where the product is clamped against the product support area 107 of the support surface 105 of the base 103 to simulate the height of the edge portion 605 after the product 601 (e.g., protective cover glass sheet) is installed on another product (e.g., portable electronic device). The measured height of the clamped and unclamped product for each location on the edge portion 605 can be stored in the database 133. This information can be used to identify products with edge portion locations having unacceptable maximum and/or minimum heights or can provide product information that may be used to further refine the process of fabricating the products or using the products (e.g., as a cover glass sheet for an electronic device).

Embodiments and the functional operations described herein can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine readable storage substrate, a memory device, or a combination of one or more of them.

The term "processor" or "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with implementations of the subject matter described herein, or any combination of one or more such back end, middleware, or front end components. The components of the system can be interconnected by any form or medium of digital data communication, e.g., a communication network. Embodiments of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" comprises embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

The invention claimed is:

1. An apparatus comprising:
 a base comprising a support surface comprising a product support area;
 a probe movable in a direction along a probe axis that intersects a determination axis; and
 a clamping pin movable along a clamping pin axis that intersects the product support area.

2. The apparatus of claim 1, wherein the determination axis is linear.

3. The apparatus of claim 1, wherein a shoulder defines the determination axis.

4. The apparatus of claim 3, wherein the shoulder comprises a plurality of shoulder segments spaced apart from one another.

5. The apparatus of claim 4, wherein the probe axis extends within a space defined between a corresponding pair of segments of the plurality of shoulder segments.

6. The apparatus of claim 5, wherein the probe axis and the clamping pin axis are aligned in a direction perpendicular to the determination axis.

7. The apparatus of claim 6, wherein the clamping pin is supported by a support arm.

8. The apparatus of claim 7, wherein a spring biases the clamping pin to an extended position relative to the support arm.

9. The apparatus of claim 8, wherein the probe is movable through an opening defined by the support arm.

10. The apparatus of claim 9, wherein the probe comprises a probe tip comprising a substantially flat engagement surface.

11. The apparatus of claim 10, wherein the substantially flat engagement surface is parallel to a substantially flat portion of the support surface.

12. The apparatus of claim 11, wherein the probe axis is perpendicular to the determination axis.

13. The apparatus of claim 12, wherein the probe comprises a plurality of probes spaced apart from one another along the determination axis.

14. The apparatus of claim 13, wherein the clamping pin comprises a plurality of clamping pins, and each clamping pin of the plurality of clamping pins is aligned with a corresponding probe of the plurality of probes.

15. A method of determining a height of an edge portion of a product comprising:
 placing the product on a product support area of a support surface of a base; aligning the edge portion of the product along a determination axis;
 clamping the product to the base at a clamping location of the product positioned over the product support area;

extending a probe to contact a location of the edge portion of the product while the product is clamped to the base; and determining a height of the edge portion of the product based on the position of the probe contacting the edge portion of the product.

16. The method of claim 15, wherein the probe comprises a probe tip comprising a substantially flat engagement surface, wherein extending the probe to contact the edge portion of the product contacts the substantially flat engagement surface of the probe tip with the edge portion of the product.

17. The method of claim 16, wherein clamping the product to the base flattens the product against the product support area at the clamping location.

18. The method of claim 17, wherein the clamping location is aligned with the location of the edge portion contacted by the probe along a direction perpendicular to an outer edge of the edge portion.

19. The method of claim 18, wherein clamping the product to the base comprises moving a clamping pin to contact the product at the clamping location to press the product against the base at the clamping location.

20. The method of claim 19, wherein extending the probe comprises moving the probe through an opening defined by a support arm that supports the clamping pin.

21. A method of determining a height profile of an edge portion of a product comprising:

placing the product on a product support area of a support surface of a base; aligning the edge portion of the product along a determination axis;

clamping the product to the base at a plurality of clamping locations of the product positioned over the product support area;

extending a plurality of probes to each contact a corresponding location of a plurality of locations of the edge portion of the product while the product is clamped to the base; and determining a height of the edge portion of the product at each location of the plurality of locations of the edge portion based on the corresponding position of each probe of the plurality of probes.

22. The method of claim 21, wherein each probe of the plurality of probes comprises a probe tip comprising a substantially flat engagement surface, wherein extending the plurality of probes contacts the substantially flat engagement surface of each probe tip of the plurality of probes with the corresponding location of the plurality of locations of the edge portion of the product.

23. The method of claim 22, wherein clamping the product to the base flattens the product against the product support area at the plurality of clamping locations.

24. The method of claim 23, wherein the clamping location of each of the plurality of clamping locations is aligned with a corresponding location of the plurality of locations of the edge portion along a direction perpendicular to an outer edge of the edge portion.

25. The method of claim 24, wherein clamping the product to the base comprises moving a plurality of clamping pins to contact the product at the plurality of clamping locations to press the product against the base at the plurality of clamping locations.

26. The method of claim 25, wherein extending the plurality of probes comprises moving each probe of the plurality of probes through an opening defined by a corresponding support arm that supports a corresponding clamping pin of the plurality of clamping pins.

* * * * *